(12) United States Patent
Machida et al.

(10) Patent No.: US 12,334,062 B2
(45) Date of Patent: Jun. 17, 2025

(54) INFORMATION-PROCESSING APPARATUS, INFORMATION-PROCESSING METHOD, AND PROGRAM

(71) Applicant: NTT TechnoCross Corporation, Tokyo (JP)

(72) Inventors: Kenichi Machida, Tokyo (JP); Kazuhira Matsui, Tokyo (JP); Asato Tanaka, Tokyo (JP)

(73) Assignee: NTT TechnoCross Corporation, Tokyo (JP)

( * ) Notice: Subject to any disclaimer, the term of this patent is extended or adjusted under 35 U.S.C. 154(b) by 0 days.

(21) Appl. No.: 17/762,322

(22) PCT Filed: Jan. 14, 2022

(86) PCT No.: PCT/JP2022/001144
§ 371 (c)(1),
(2) Date: Mar. 21, 2022

(87) PCT Pub. No.: WO2022/209143
PCT Pub. Date: Oct. 6, 2022

(65) Prior Publication Data
US 2024/0013779 A1    Jan. 11, 2024

(30) Foreign Application Priority Data

Mar. 31, 2021   (JP) ................. 2021-059677

(51) Int. Cl.
| | | |
|---|---|---|
| *G10L 15/18* | (2013.01) | |
| *G10L 15/26* | (2006.01) | |
| *H04M 3/51* | (2006.01) | |

(52) U.S. Cl.
CPC .......... *G10L 15/1822* (2013.01); *G10L 15/26* (2013.01); *H04M 3/5175* (2013.01)

(58) Field of Classification Search
None
See application file for complete search history.

(56) References Cited

U.S. PATENT DOCUMENTS

| 9,601,117 B1 * | 3/2017 | Pettay | ................. H04M 7/0027 |
| 2015/0117632 A1 * | 4/2015 | Konig | ................. H04M 3/5191 |
| | | | 379/265.12 |

(Continued)

FOREIGN PATENT DOCUMENTS

| JP | 2008123447 A | 5/2008 |
| JP | 2020052809 A | 4/2020 |

OTHER PUBLICATIONS

"AI solution for call center operation support determined to be introduced to Japan Post Bank, High-precision voice recognition helps operators improve efficiency of answering and administrative tasks," Internet <URL:https://www.ntt-tx.co.jp/whatsnew/2020/200519.html>, Corresponding to English Documents, Internet <https://www.ntt-tx.com/products/foresight_vm/>.

(Continued)

*Primary Examiner* — Nafiz E Hoque

(57) ABSTRACT

An information-processing apparatus comprises: an identification unit configured to identify at least one of important matters, depending on inquiry contents from a first speaker to a second speaker in a conversation among multiple persons, the at least one of the important matters being matters that the second speaker is to explain to or confirm with the first speaker; and a presentation unit configured to present to the second speaker the at least one of the important matters that has been identified.

21 Claims, 9 Drawing Sheets

(56) References Cited

U.S. PATENT DOCUMENTS

2016/0094411 A1\* 3/2016 Brennan ............ H04L 41/5009
709/224
2021/0104240 A1\* 4/2021 Saeki ................... G10L 15/063

OTHER PUBLICATIONS

International Patent Application No. PCT/JP2022/001144, International Search Report mailed Apr. 5, 2022, 9 pages.

\* cited by examiner

| Call Reason ID | Call Reason Name | Detection Condition | Checklist ID | ... |
|---|---|---|---|---|
| a-1 | Product Information | Both: Insurance | Y-1<br>Z-3 | ... |
| a-2 | Contract Procedure | Both: Contract | X-2<br>Y-2<br>Z-1 | ... |
| b-1 | Address Change | Client: Address Change | Z-1<br>Z-2 | ... |
| c-1 | Payment Process | Both: Payment | X-1 | ... |
| ... | ... | ... | ... | ... |

FIG.4

| Checklist ID | Checklist Name | Item Number | Check Contents | Check Condition | Importance | ... |
|---|---|---|---|---|---|---|
| X-1 | Financial Institution | 1 | Confirm Financial Institution | Term Spoken | Medium | ... |
| | | 2 | Confirm Account Number | Term Spoken Spoken twice | High | ... |
| | | 3 | Confirm Account Holder | Term Spoken | Medium | ... |
| X-2 | Conclusion of Contract | 1 | Confirm Date of Contract | Term Spoken | Medium | ... |
| | | 2 | Explain Terms and Conditions | Term Spoken | High | ... |
| Y-1 | ... | ... | ... | ... | ... | ... |
| ... | ... | ... | ... | ... | ... | ... |

OPERATOR SCREEN ~1000

1100
- 11:10:15
  Thank you for calling the call center. This is Hayashi speaking.
- 11:10:20
  Excuse me. I would like to confirm something about payment.
- 11:10:23
  Yes, your inquiry is about payment, right?
- 11:10:30
  Would you give me your full name?
- 11:10:35
  TARO YAMADA
- 11:10:40
  Thank you, Mr. Taro Yamada. Would you tell me your financial institution where you make payment?
- ...

IMPORTANT MATTER CHECKLIST (FINANCIAL INSTITUTION) ~1200
- ☑ CONFIRM FINANCIAL INSTITUTION ~1201
- ☐ CONFIRM ACCOUNT NUMBER ~1202
- ☐ CONFIRM ACCOUNT HOLDER ~1203

FIG.8

| Call ID | Operator ID | Customer ID | Call Reason ID | Checklist ID | Item Number | Check Contents | Presence or Absence of Speech | Importance | 109 |
|---|---|---|---|---|---|---|---|---|---|
| C001 | U001 | 090-1111-2222 | c-1 (Payment Process) | X-1 | 1 | Confirm Financial Institution | Present | Medium | ⋮ |
| | | | | | 2 | Confirm Account Number | Present | High | ⋮ |
| | | | | | 3 | Confirm Account Holder | Present | Medium | ⋮ |
| | | | a-1 (Product Information) | Y-1 | ⋮ | ⋮ | ⋮ | ⋮ | ⋮ |
| | | | | Z-3 | ⋮ | ⋮ | ⋮ | ⋮ | ⋮ |
| C002 | ⋮ | ⋮ | ⋮ | ⋮ | ⋮ | ⋮ | ⋮ | ⋮ | ⋮ |

ND PROGRAM

INFORMATION-PROCESSING APPARATUS, INFORMATION-PROCESSING METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2022/001144, filed on Jan. 14, 2022, which application claims priority to and the benefit of JP Application No. 2021-059677, filed on Mar. 31, 2021, the disclosures of which are hereby incorporated herein by reference in their entireties.

TECHNICAL FIELD

The invention relates to an information-processing apparatus, an information-processing method, and a program.

BACKGROUND ART

An analysis system of a contact center (also called a call center) has been conventionally known (for example, non-patent document 1) and introduced in many contact centers for a purpose of supporting an operation by an operator, improving operational efficiency, and increasing customer satisfaction.

Contact centers often respond to various inquiries about products and services, and depending on inquiry contents, there are certain matters that is to be explained to or confirmed with a customer. Such matters are hereinafter referred to as "important matters."

CITATION LIST

Non-Patent Document

Non-patent Document 1: "AI solution for call center operation support determined to be introduced to Japan Post Bank, High-precision voice recognition helps operators improve efficiency of answering and administrative tasks," Internet <URL:https://www.ntt-tx.co.jp/whats-new/2020/200519.html>

SUMMARY OF INVENTION

Technical Problem

However, in some cases, for example, an operator may forget to speak about important matters. For this reason, there is a need to present to an operator what important matters exist, depending on inquiry contents of the customer, and to prompt the operator to speak about them.

An embodiment of the present invention is made in view of the above aspects and an object of invention is to present important matters.

Solution to Problem

To achieve the above-mentioned object, an information-processing apparatus according to an embodiment has an identification unit configured to identify at least one of important matters, depending on inquiry contents from a first speaker to a second speaker in a conversation among multiple persons, the at least one of the important matters being matters that the second speaker is to explain to or confirm with the first speaker, and a presentation unit configured to present the at least one of the important matters that has been identified, to the second speaker.

Advantageous Effects of Invention

Important matters can be presented.

BRIEF DESCRIPTION OF DRAWINGS

FIG. 3 is a drawing showing an example of a call reason DB.

FIG. 4 is a drawing showing an example of an important matter DB.

FIG. 6 is a drawing showing an example of an operator screen.

FIG. 8 is a drawing showing an example of an important matter history DB.

DESCRIPTION OF EMBODIMENTS

An embodiment of the present invention will be described below. The embodiment describes a contact center system 1 that can present important matters to an operator of a contact center. However, the contact center is merely an example, and the same can be also applied to cases other than contact centers, for example, when important matters are to be presented to a sales representative of a product a service, and the like, or a contact person of a store, during sales or contact operations. More generally, the same can be applied to presentation of important matters to a certain person (One person or multiple persons are possible) in a conversation among multiple of persons.

In the following description, it will be assumed that the contact center operator performs operations such as responding to inquiries, through a voice call with a customer. However, without being limited to this, the same can also be applied to cases in which the operations are conducted via text chats (including those in which stamps, attachments, and so on can be sent and received in addition to text), video calls, and the like.

As mentioned above, an important matter is a matter that is to be explained to or confirmed with the customer, depending on inquiry contents. For example, when signing a contract for a product or service, matters such as "explaining terms and conditions" and the like fall under a category of important matters. Further, for example, matters such as "confirming current address," "confirming new address," "confirming the moving date," and the like fall under the category of important matters during a procedure of an address change. However, what matters fall under the category of important matters may vary depending on the type of a product or a service being inquired about, depending on the company and the like handling the product or the service, and so on.

In recent years, with the acceleration of online business and the increase in the number of contact center operations, the variations in the inquiry contents has increased, and the important matters that operators are to explain have become more diverse. For this reason, it is considered that introduction of the contact center system 1 according to the embodiment to present important matters to operators can be expected not only to prevent the operators from forgetting to speak about important matters but also to reduce the workload of the operators.

<Overall Structure>

Figure 1:
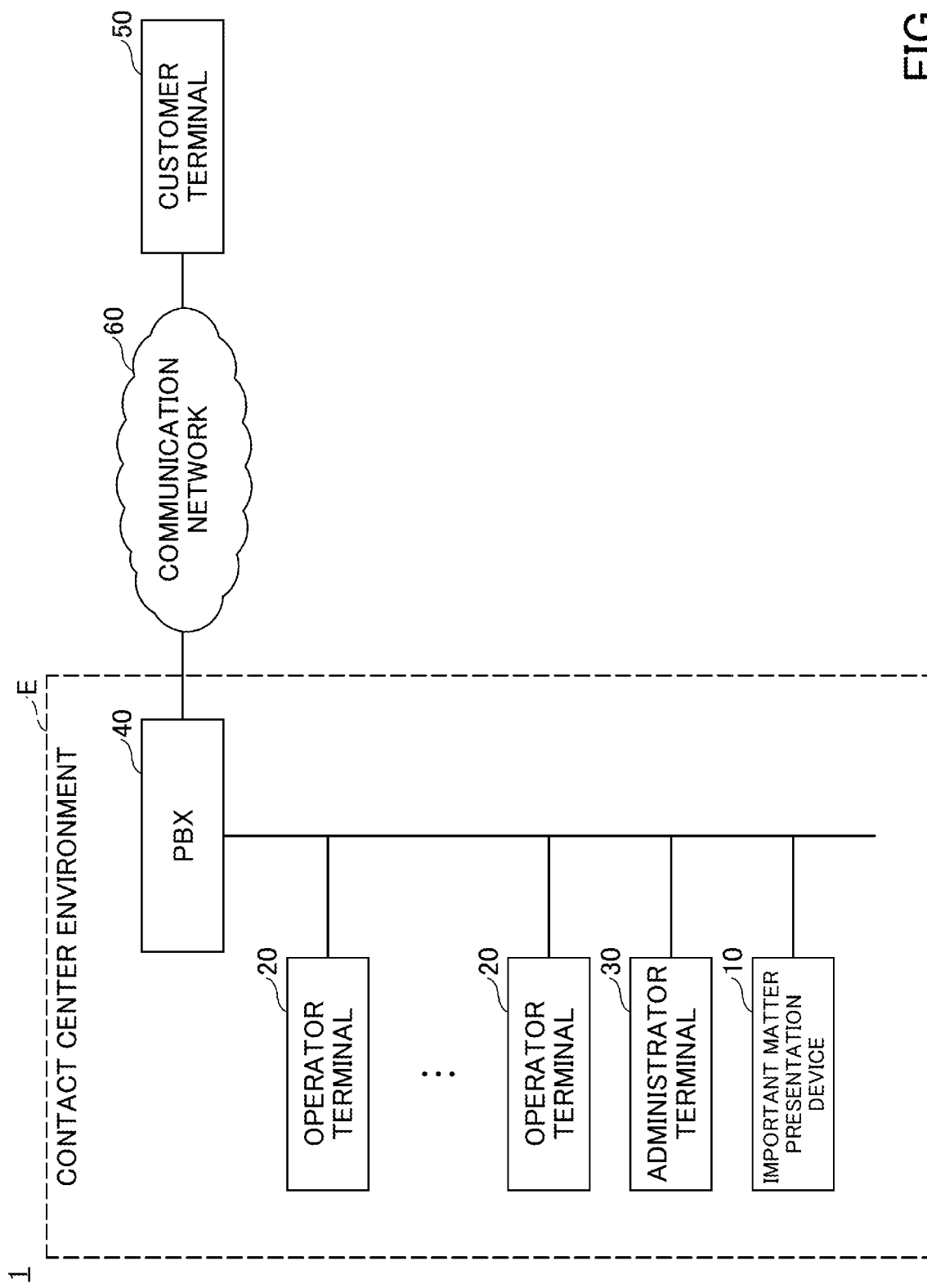
FIG. 1 is a drawing showing an example of an overall structure of a contact center system according to the embodiment.

First, an overall structure of the contact center system 1 according to the embodiment will be explained with reference to FIG. 1. FIG. 1 shows an example of the overall structure of the contact center system 1 according to the embodiment.

As shown in FIG. 1, the contact center system 1 according to the embodiment includes an important matter presentation device 10, operator terminals 20, an administrator terminal 30, a PBX 40, and a customer terminal 50. The important matter presentation device 10, the operator terminals 20, the administrator terminal 30, and the PBX 40 are installed in a contact center environment E, which is a system environment of a contact center. Note that the contact center environment E is not limited to a system environment in the same building, but may be, for example, a system environment in a number of geographically separated buildings.

The important matter presentation device 10 converts a voice call between a customer and an operator into a text by voice recognition, detects a call reason from this text, identifies an important matter corresponding to the call reason, and presents the identified important matter to the operator. The call reason is the reason why the customer called the call center (the reason for incoming call), and corresponds to inquiry contents by the customer. There may be more than one call reason in a single call (For example, a customer calls the call center for two reasons: to ask about the procedure of an address change and to change a contract plan).

Further, the important matter presentation device 10 administrates a history including whether an operator has spoken one or more important matters, and analyzes it in response to a request from the administrator terminal 30. This makes it possible for a user of the administrator terminal 30 (i.e., the administrator who manages the operators) to know, for example, whether a speech related to important matters has not been unaddressed, and what important matters are likely to go unaddressed, and so on.

The operator terminals 20 are various types of terminals such as PCs and the like used by the operators who respond to inquiries from customers, and function as IP (Internet Protocol) telephones. The operator terminals 20 display contents of a call with a customer when responding to the inquiry from the customer, and also display a checklist of important matters presented by the important matter presentation device 10 (hereinafter referred to as "important matter checklist"). By referring to the important matter checklist displayed on the operator terminals 20, the operator can know the important matters that are to be spoken and whether the operator has already spoken the important matters based on presence or absence of the check.

The administrator terminal 30 is a terminal of various types such as a PC (personal computer) used by the administrator who manages the operators (such an administrator is also called a supervisor).

The PBX 40 is a telephone exchange device (IP-PBX) and is connected to a communication network 60 including a Voice over Internet Protocol (VoIP) network and a Public Switched Telephone Network (PSTN).

A customer terminal 50 is a terminal of various types, such as a smartphone, a mobile phone, or a fixed-line phone used by a customer.

The overall structure of the contact center system 1 shown in FIG. 1 is an example, and other structures are possible. For example, in the example shown in FIG. 1, the important matter presentation device 10 is included in the contact center environment E (i.e., the important matter presentation device 10 is an on-premise type), but all or part of the functions of the important matter presentation device 10 may be realized by a cloud service or the like. Similarly, in the example shown in FIG. 1, the PBX 40 is an on-premise type telephone exchange device, but it may be realized by a cloud service. Although the operator terminals 20 also function as an IP telephone, for example, in addition to the operator terminals 20, a telephone may be included in the contact center system 1.

<Functional Configuration>

Figure 2:
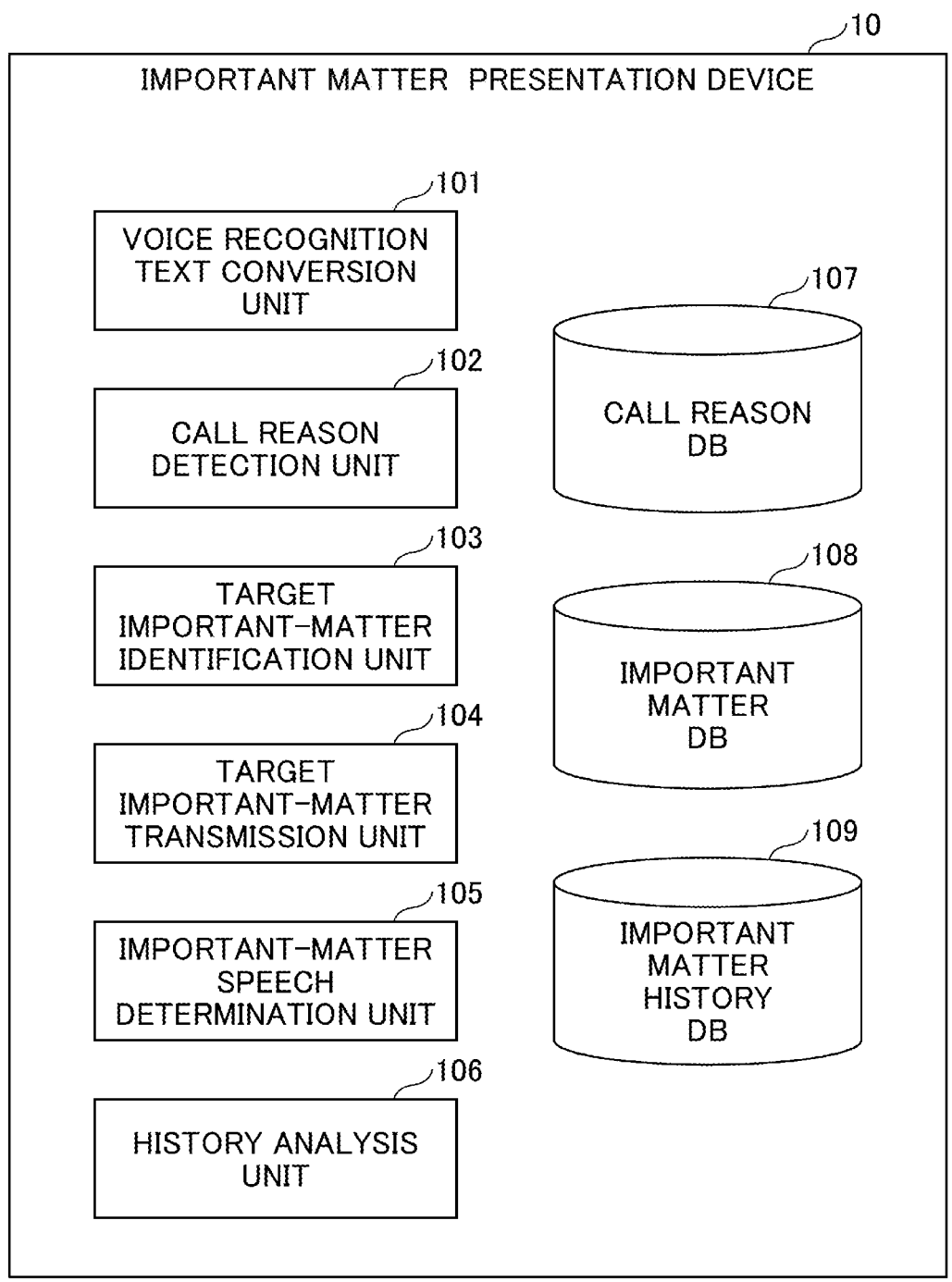
FIG. 2 is a drawing showing a functional configuration of an important matter presentation device according to the embodiment.

Next, a functional configuration of the important matter presentation device 10 will be explained with reference to FIG. 2. FIG. 2 shows an example of the functional configuration of the important matter presentation device 10.

As shown in FIG. 2, the important matter presentation device 10 has a voice recognition text conversion unit 101, a call reason detection unit 102, a target important-matter identification unit 103, a target important-matter transmission unit 104, an important-matter speech determination unit 105, and a history analysis unit 106. For example, these units are realized by a process that, for example, one or more programs installed in the important matter presentation device 10 cause a processor such as a CPU (Central Processing Unit), to perform.

Further, the important matter presentation device 10 according to the embodiment has a call reason DB 107, an important matter DB 108, and an important matter history DB 109. Each of these DBs (databases) is realized, for example, by a storage device such as an auxiliary storage device. At least one of these DBs may be realized by a database server or the like that is connected to the important matter presentation device 10 via a communication network.

The voice recognition text conversion unit 101 converts a voice call between an operator terminal 20 and a customer terminal 50 into text by voice recognition. At this time, the voice recognition text conversion unit 101 performs voice recognition for each speaker and conversion into text. In this way, the voice of the operator and the voice of the customer are individually converted into text.

This voice recognition is performed repeatedly during a voice call between the operator terminal 20 and the customer terminal 50 (for example, it may be performed every few seconds or for every word or phrase spoken by the customer or the operator).

The call reason detection unit 102 refers to the call reasons DB 107 and detects a call reason from the text converted by the voice recognition text conversion unit 101. The call reason DB 107 is a data base that stores information for detecting a call reason from the content spoken by the customer or the operator, as well as identification information of the important matter checklist corresponding to the call reason. The details of the call reason DB 107 will be described below.

The target important-matter identification unit 103 refers to the call reason DB 107 and identifies the identification information of the important matter checklist corresponding to the call reason detected by the call reason detection unit 102. This important matter checklist is the checklist of the important matters to be presented to the operator (hereinafter referred to as "target important matters").

The target important-matter transmission unit 104 reads the contents of the important matter checklist of the identification information identified by the important-matter identification unit 103 from the important matter DB 108, and sends the contents of the checklist to the operator terminal 20. In this way, the relevant important matter checklist is presented to the operator. The important matter DB 108 is a database that stores information indicating the contents of the important matter checklist (check contents) and information indicating their check conditions. The details of the important matter DB 108 are described below.

The important-matter speech determination unit 105 refers to the important matter DB 108 and determines the presence or absence of the speech related to the target important matter from the text converted by the voice recognition text conversion unit 101 (that is, determines whether the check conditions are satisfied). The information including this determination result is stored as history information in the important matter history DB 109. In addition to the determination result indicating whether the operator has spoken the target important matter, various other information may be stored in the important matter history DB 109. For example, other information such as a call ID identifying a call between an operator and a customer, an operator ID identifying the operator, a customer ID identifying the customer, text of all or part of contents of a call between an operator and a customer, a call reason ID identifying a call reason, etc. may also be stored as the history information. For example, data sent and received in a text chat (text data, image data representing a stamp, and the like), attached files in a text chat, video data and screen display data in a video call, electronic files displayed in a video call, and the like may also be stored as the history information.

In this embodiment, as an example, a call ID is used as a key and the history information is stored in the important matter history DB 109 for each call. The relevant history information includes at least the call ID, the operator ID, the customer ID, the call reason ID, each target important matter in the important matter checklist corresponding to the relevant call reason ID, and the determination result corresponding to the target important matter.

The history analysis unit 106 analyzes the history information stored in the important matter history DB 109 in response to a request from the administrator terminal 30.

<<Call Reason DB 107>>

Next, the details of the call reason DB 107 are described with reference to FIG. 3. FIG. 3 is a drawing showing an example of the call reason DB 107.

As shown in FIG. 3, information (data or records) corresponding to call reason IDs, call reason names, the detection conditions, and checklist IDs are stored in the call reason DB 107.

The call reason ID is an ID identifying a call reason. The call reason name is a name of the call reason. The detection condition is a condition for the call reason detection unit 102 to detect the call reason. The checklist ID is a checklist ID that identifies the important matter checklist corresponding to the call reason.

For example, the information in the first row of the call reason DB 107 shown in FIG. 3 is the call reason ID "a-1," the call reason name "Product Information," the detection conditions "Both: Insurance," and the checklist IDs "Y-1" and "Z-2." Similarly, for example, the information in the second row of the call reason DB 107 shown in FIG. 3 is the call reason ID "a-2," the call reason name "contract procedure," the detection conditions "Both: Contract," and the checklist IDs "X-2," "Y-2," and "Z-1."

In this embodiment, as an example, the detection condition is expressed in a form of "Speaker: Word." This means that the detection condition is satisfied when the relevant word is spoken by the relevant speaker. For example, the detection condition "Both: Insurance" means that the detection condition is satisfied when the word "insurance" is spoken by both the operator and the customer. Similarly, for example, the detection condition "Customer: Address Change" means that the detection condition is satisfied when the word "address change" is spoken by the customer. Similarly, for example, the detection condition "Operator: A" means that the detection condition is satisfied when the word "A" is spoken by the operator (not illustrated in FIG. 3).

However, the above-mentioned form of the detection conditions is an example, and detection conditions may be expressed in various forms (for example, forms such as a logical expression, and the like).

<<Important Matter DB 108>>

Next, the details of the important matter DB 108 will be described with reference to FIG. 4. FIG. 4 is a drawing showing an example of the important matter DB 108.

As shown in FIG. 4, information (data or records) corresponding to a checklist ID, a checklist name, an item number, check contents, check conditions, and importance are stored in the important matter DB 108.

The checklist ID is a checklist ID that identifies an important matter checklist. The checklist name is a name of an important matter checklist. The item number is an item number of check contents that constitute an important matter checklist. The check contents are check contents that constitute an important matter checklist and correspond to the important matters that are to be explained to or confirmed with a customer. The check condition is a condition to determine whether the check contents are satisfactory (i.e., whether important matters have been spoken). The importance is the importance of check contents (i.e., important matters).

For example, the information in the first row of the important matter DB 108 shown in FIG. 4 describes Checklist ID "X-1," Checklist Name "Financial Institution" (Item Number "1" with Check Contents "Confirm Financial Institution," Check Condition "Term Spoken," and Importance "Medium," Item Number "2" with Check Contents "Confirm Account Number," Check Condition "Term Spoken" and "Spoken Twice," and Importance "High," Item number "3," Check Contents "Confirm Account Holder," Check Condition "Term Spoken," and Importance "Medium"). This description means that the important matter checklist with checklist ID "X-1" is named "Financial Institution" and consists of three check contents with item numbers "1" to "3."

Similarly, for example, information in the second row of the important matter DB 108 describes Checklist ID "X-2," Checklist Name "Conclusion of Contract" (Item Number "1" with Check Contents "Confirm Date of Contract," Check Condition "Term Spoken," and Importance "Medium," Item Number "2" with Check Contents "Explain Terms and Conditions," Check Condition "Term spoken," and Importance "High"). This description means that name of the important matter checklist of Checklist ID "X-2" is "Contract Conclusion" and consists of two check contents of item numbers "1" and "2".

In this embodiment, as an example, the check condition represents a condition to determine whether the operator has spoken the part of " . . . " in Check Contents "Confirm . . . " or " . . . Spoken." For example, Check Contents "Financial institution Spoken" and Check Condition "Term Spoken" mean that the check condition is satisfied when the term "financial institution" is spoken by the operator. Similarly, for example, Check Contents "Confirm Account Number," Check Condition "Term Spoken," and "Spoken Twice" mean that the check condition is satisfied when the term "account number" is spoken twice by the operator.

However, the above-mentioned check conditions are examples, and the conditions can be expressed in various ways. For example, the term A to be spoken may be set specifically, such as the check condition "A spoken." Further, for example, the check condition may be a condition that the operator asks a question to the customer and the customer responds to it thereafter. Specifically, the check condition may be "Term spoken by operator and response spoken by customer," etc.

<Presentation of Target Important Matter and Speech Determination>

In the following, assuming that a voice call is being made between the operator terminal 20 and the customer terminal 50, it is explained how to process presentation of the target important matter to the operator and determination whether it has been spoken. It is assumed that the above-mentioned voice call is converted into text in real time by the voice recognition text conversion unit 101 and stored in a predetermined memory or the like. In the following, the operator's voice converted into text by voice recognition is also referred to as "operator voice text" and the customer's voice converted into text by voice recognition is also referred to as "customer voice text."

<<Presentation of Target Important Matter>>

Figure 5:
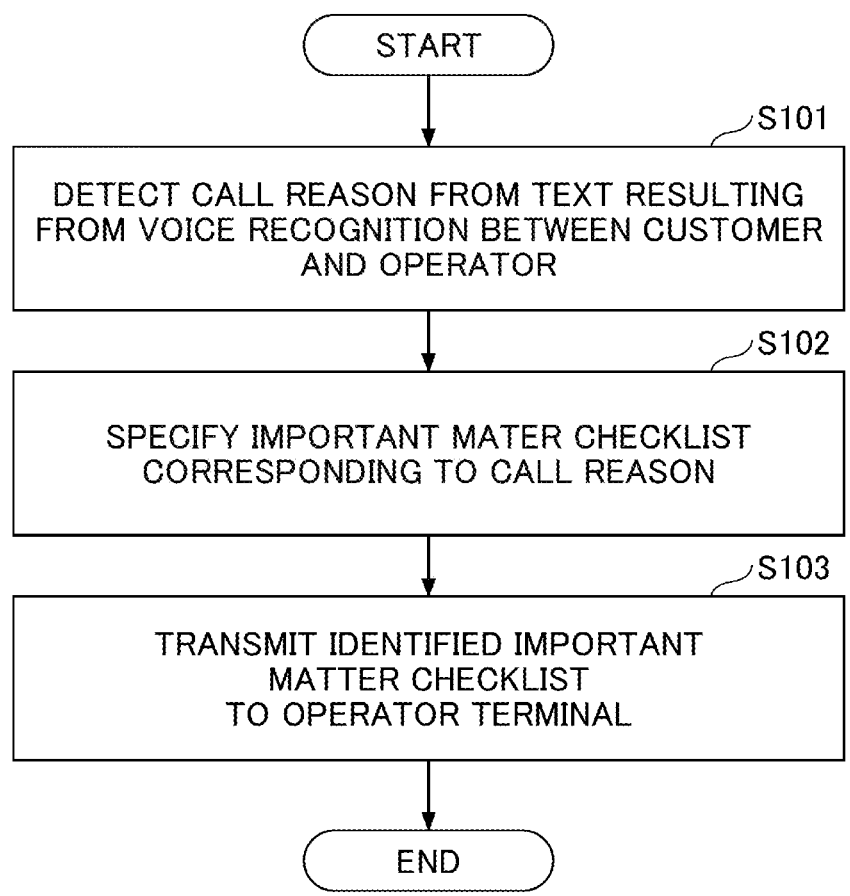
FIG. 5 is a flowchart showing an example of a flow of a process of presenting a target important matter.

First, the flow of a process of presenting target important matters to the operator in the form of a checklist will be described with reference to FIG. 5. FIG. 5 is a flowchart showing an example of the flow of the process of presenting the target important matters.

The call reason detection unit 102 refers to the call reason DB 107 and detects the call reason from one or both of the operator voice text and the customer voice text (Step S101). That is, the call reason detection unit 102 refers to each record stored in the call reason DB 107 and determines whether there is a record in which the most recently obtained operator voice text and customer voice text satisfy the detection conditions. Then, the call reason detection unit 102 identifies the call reason ID and call reason name of the record that has been determined as satisfying the detection conditions. In this way, the call reason with this call reason ID and call reason name is detected.

The most recently obtained operator voice text and customer voice text may be, for example, the operator voice text and customer voice text obtained a few seconds prior to the current time, or the operator voice text corresponding to the operator's voice in the most recent one to a few phrases and the customer voice text corresponding to the customer's voice in the most recent one to a few phrases.

Next, the target important-matter identification unit 103 refers to the call reason DB 107 and identifies the checklist ID in the important matter checklist corresponding to the call reason detected in the step S101 (Step S102). That is, the target important-matter identification unit 103 refers to the record of the call reason ID identified in the step S101 among the records stored in the call reason DB 107, and identifies the checklist ID included in this record. The important matter checklist of this checklist ID is the checklist of the target important matter.

The target important-matter transmission unit 104 reads the important matter checklist corresponding to the checklist ID identified in the Step S102, from the important matter DB 108 and sends the contents of the important matter checklist to the operator terminal 20 (Step S103). That is, the target important-matter transmission unit 104 refers to the record of the checklist ID identified in the step S102 among the records stored in the important matter DB 108, and sends the checklist name, the item number, and the check contents of this record to the operator terminal 20. In this way, the important matter checklist consisting of the target important matters is presented to the operator. When multiple checklist IDs are identified in the step S102, multiple important matter checklists are presented to the operator.

An example of an operator screen displayed on the operator terminal 20 is described below. The important matter checklist is displayed on the operator screen. An operator screen 1000 shown in FIG. 6 includes a speech content display column 1100. In this speech content display column 1100, texts showing speech contents during a call between a customer and an operator (That is, the customer voice text and the operator voice text) are displayed. An important matter checklist 1200 presented by the important matter presentation device 10 is also displayed in the operator screen 1000 shown in FIG. 6. In the example shown in FIG. 6, the important matter checklist 1200 with checklist ID "X-1" and checklist name "Financial Institution" is displayed, and the target important matters 1201 to 1203 are shown in a form of a checklist. In the example shown in FIG. 6, the important matter checklist 1200 with checklist ID "X-1" and checklist name "Financial Institution" is displayed in response to the customer's speech "Excuse me, I would like to confirm something about payment" and the operator's speech "Yes, your inquiry is about payment, right?"

The operator can know the important matters that are to be explained to or confirmed with the customer by the important matter checklist 1200 displayed on the operator screen 1000. This makes it possible to prevent the operator from forgetting to explain or confirm the important matters.

In this embodiment, it is assumed that the customer terminal 50 has only a voice call function. However, for example, if the customer terminal 50 has a screen display function, a customer screen can be shown on a display of the relevant customer terminal 50. In this case, for example, a similar or an analogous important matter checklist as shown on the operator screen is displayed on the customer screen. At this time, the presence or absence of speech of each important matter may be synchronized between the important matter checklist on the customer screen and the important matter checklist on the operator screen, or display-components such as buttons to request speech repetition of important matters that have already been spoken may be provided.

<<Speech Determination of Target Important Matters>>

Figure 7:
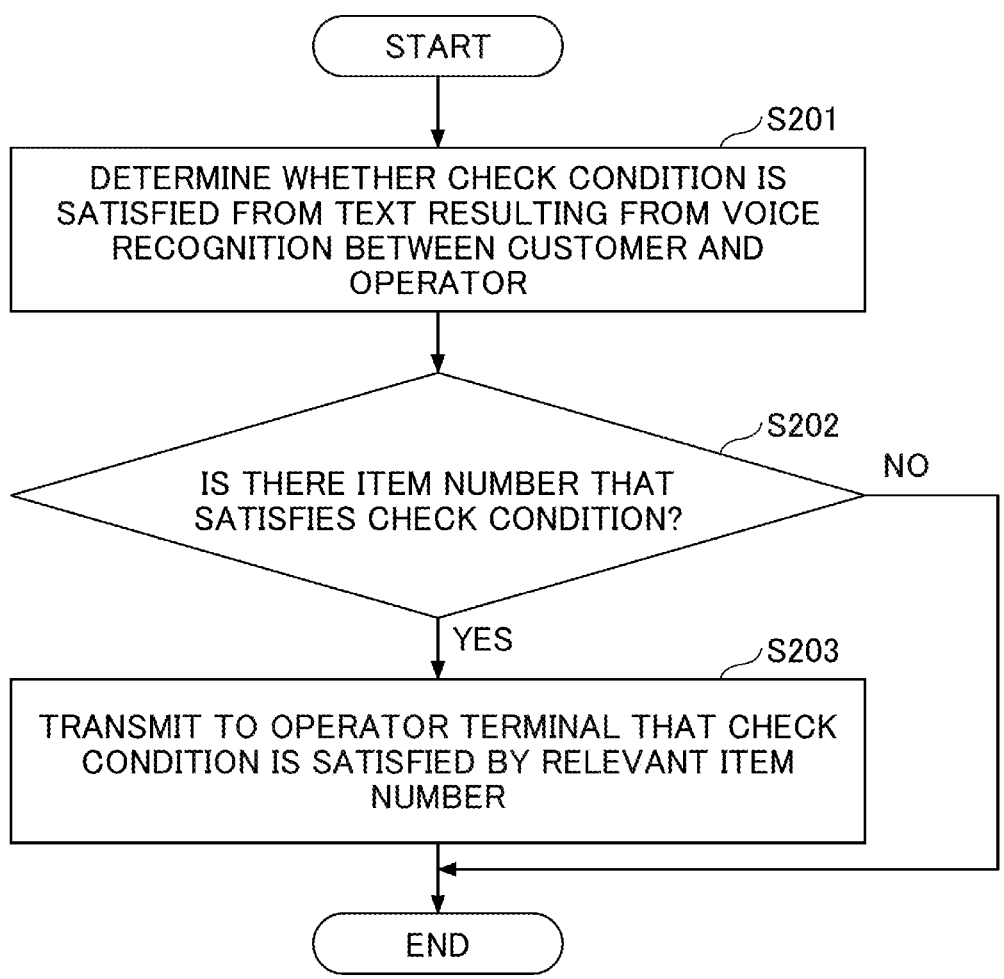
FIG. 7 is a flowchart showing an example of a flow of a process of determining a speech related to a target important matter.

Next, assuming that the important matter checklist has been displayed on the operator screen, a flow of a process to determine whether a speech related to the target important matters which constitute the important matter checklist has been made will be explained with reference to FIG. 7. FIG. 7 is a flowchart showing an example of a flow of a process for determining a speech related to a target important matter.

The important-matter speech determination unit 105 refers to the important matter DB 108 and determines presence or absence of speech related to the target important matter from the operator voice text (Step S201). That is, the important-matter speech determination unit 105 refers to the record of the checklist ID identified in step S102 of FIG. 5 (i.e., the checklist ID of the important matter checklist presented to the operator terminal 20) among the records stored in the important matter DB 108, and determines whether the most recently obtained operator speech text satisfies the check condition of each item number contained in the relevant record. However, such a determination is not necessary for item numbers that have already been determined as satisfying the check condition.

Next, if there is an item number that has been determined as satisfying the check condition in the step S201 ("YES" in the step S202), the target important-matter transmission unit 104 sends information indicating that the relevant item number satisfies the check condition, to the operator terminal 20 (step S203). That is, the target important-matter transmission unit 104 transmits, for example, the checklist ID of the relevant important matter checklist and the item number that has been determined as satisfying the check condition in the step S201, to the relevant operator terminal 20. In this way, the important-matter checklist displayed on the operator screen of the operator terminal 20 is updated to indicate that the relevant target important matter has been spoken. However, instead of transmitting the item number that has been determined as satisfying the check condition in the step S201, for example, an important matter checklist reflecting the determination result of the check condition and the screen display information of that important matter checklist may be transmitted.

In the operator screen 1000 shown in FIG. 6, a check mark is placed on the target important matter 1201 of the important matter checklist 1200 to indicate that this target important matter 1201 has been spoken in response to the operator's speech, "Thank you Mr. Taro Yamada. Would you tell me your financial institution where you make payment?"

In this embodiment, as an example, a case where the target important matters are presented to the operator in the form of a checklist is described. However, without being limited to this, the target important matters may be presented to the operator in other forms. For example, the target important matters may be presented to the operator merely in the form of a list. Further, for example, at least one of the target important matters that are to be explained or confirmed next may be presented to the operator after sorting the target important matters in the order of explanation, in the order of confirmation, and the like, or the target important matters that have not been explained or confirmed may be displayed above the target important matters that have already been explained or confirmed. Furthermore, as mentioned above, the target important matters may be presented not only to the operator but also to the customer, for example. By presenting the target important matters to both the operator and the customer, the customer can know the matters to be explained or confirmed by the operator, and both the operator and the customer can recognize that the explanation or the confirmation has been completed when there are no more target important matters that have not been explained or confirmed.

Not only the important matter checklist is displayed on the operator screen, but also, instead of (or along with) this, the contents of the target important matters may be presented to the operator by voice.

<Storage of History Information Including Determination Result of Presence or Absence of Speech of Target Important Matters>

When the voice call between the operator terminal 20 and the customer terminal 50 is completed, the history information including the determination result in the step S201 of FIG. 7 is stored in the important matter history DB 109. In this embodiment, as described above, the history information includes at least the call ID of the relevant voice call, the operator ID of the operator of the relevant operator terminal 20, the customer ID of the customer of the relevant customer terminal 50, the call reason ID of the call reason detected in the relevant voice call, each target important matter of the important matter checklist corresponding to each of the relevant call reasons, and the determination result (presence or absence of speech). The customer ID is an ID uniquely assigned to a customer, and it may be a telephone number. In this embodiment, as an example, it is assumed that the customer ID is a telephone number.

FIG. 8 shows an example of the history information stored in the important matter history DB 109. The history information in the first row of the important matter history DB 109 shown in FIG. 8 describes Call ID "C001," Operator ID "U001," Customer ID "090-1111-2222," Call Reason ID "c-1," with Checklist ID "X-1," (Item Number "1" with Check contents: "Confirm Financial Institution," Presence or Absence of Speech: "Present," and Importance: "Medium"; Item Number "2" with Check Contents: "Confirm Account Number," Presence or Absence of Speech: "Present," and Importance: "High"; Item Number "3" with Check Contents: "Confirm Account Holder," Presence or Absence of Speech: "Present," and Importance: "Medium") and Call Reason ID "a-1," with Checklist ID "Y-1," . . . , Checklist ID "Z-3," and so on. This description means that the call with Call ID "C001" is a call between an operator with Operator ID "U001" and a customer with Customer ID "090-1111-2222," and that the call reason "Payment Process" with Call Reason ID "c-1" and the call reason "Product Information" with Call Reason ID "a-1" have been detected in this call. The description also means that the Checklist ID corresponding to the call reason "Payment Process" with Call Reason ID "c-1" is "X-1," and that all the target important matters of Item Numbers "1" to "3" constituting the important matter checklist of this checklist ID have been spoken. If there is any target important matter that has not been determined to have been spoken, the presence or absence of speech of the target important matter is set to "absent."

By analyzing (including mere searching) the history information stored in the above-mentioned important matter history DB 109 under various conditions, for example, it is possible for the administrator using the administrator terminal 30 to know whether any important matters have been unaddressed and what important matters are likely to go unaddressed.

The important matter presentation device 10 (or other devices that can communicate with it) may be equipped with a trail output function that prevents falsification of information. For example, with this trail output function, for each call between a customer and an operator or for each contract with a customer, a falsification prevention process such as electronic signature may be conducted and output for the information that integrates the important matter checklist including the important matter checklist ID corresponding to the call ID or contract number and the various information serving as the basis for determination in the history information stored in the important matter history DB 109 (i.e., the basis for determination of the presence or absence of speech of the important matters).

<Analysis of Important Matter History>

In the contact center system 1 according to this embodiment, as described above, the history information stored in the important matter history DB 109 can be analyzed under various conditions. This makes it possible, for example, to check whether any speech related to the important matters have been unaddressed without checking the record of the call content or relying on a self-report submitted by the operator. In addition to this, it is also possible to analyze, for example, what kind of important matters are likely to go unaddressed.

Figure 9:
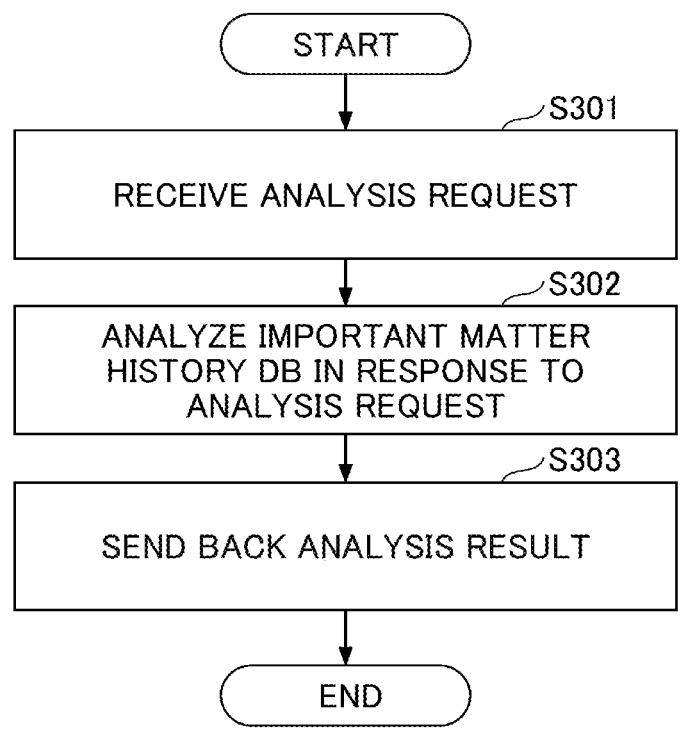
FIG. 9 is a flowchart showing an example of a flow of a process of analyzing an important matter history.

Therefore, in the following, a flow of a process of analyzing an important matter history will be described with reference to FIG. 9. FIG. 9 is a flowchart showing an example of a flow of a process of analyzing an important matter history.

The history analysis unit 106 receives an analysis request from the administrator terminal 30 (step S301). The analysis request includes analysis conditions such as types of analysis (including mere searching) to be conducted. Such an analysis request is transmitted to the important matter presentation device 10 by operation of the administrator terminal 30 by the administrator.

Next, the history analysis unit 106 analyzes the history information stored in the important matter history DB 109, in response to the analysis request received in the step S301 mentioned above (step S302). The analysis of the history information stored in the important matter history DB 109 can be done in various ways depending on the purpose of the analysis. For example, extracting a call or call reason for which presence or absence of speech for at least one important matter has resulted in "absent" or extracting the list of the important matters for which presence or absence of speech has resulted in "absent" for each operator, or extracting the list of important matters for which importance is greater than or equal to a certain value (for example, "medium" or higher) and for which presence or absence of speech has resulted in "absent." However, this is merely an example. Any analysis is possible, for example, calculating the number of appearances of important matters for which the presence or absence of speech has resulted in "absent" for each operator or call reason, or calculating various other index values.

Then, the history analysis unit 106 transmits (sends back) the analysis results of the step S302 mentioned above to the administrator terminal 30 (step S303). In this way, the analysis results are displayed on the administrator terminal 30.

<Variations>

Some variations of this embodiment are described below.

<<Variation 1>>

In FIG. 7, presence or absence of speech of the target important matter has been determined from the operator voice text. However, for example, recognition error of the voice recognition by the voice recognition text conversion unit 101 may occur, or an operator may utter speech of the target important matter in different wording. Therefore, in accordance with the operation of the operator terminal 20 by the operator, updates may be made to indicate that the target important matter of the important matter checklist has been spoken (That is, the operator can conduct an operation to apply a checkmark to each target important matter that constitutes the important matter checklist.)

The different wording of the important matters is a wording that has the same meaning as an important matter in the context, but is expressed differently. For example, "bank name" or the like may be spoken instead of the term "financial institution".

<<Variation 2>>

In FIG. 7, the presence or absence of speech of the target important matter is determined from the operator voice text. In addition to this, for example, "conducting predetermined operations" can be a target important matter and presence or absence of these operations can be determined. Examples of predetermined operations include "opening an electronic file of terms and conditions" and the like. Thus, it is determined whether the operator has conducted an operation related to "opening an electronic file of terms and conditions". Such a determination can be realized by observing a folder in which an electronic file of terms and conditions is stored.

In addition, the above-mentioned target important matter of "opening an electronic file of terms and conditions" should be performed before the target important matter of "explain terms and conditions." For this reason, not only the mere presence or absence of speech or operations but also the order (i.e., chronological order) may be considered. In this case, it is determined whether the speech related to "explain terms and conditions" is performed after a movement related to "open an electronic file of terms and conditions." In this way, in addition to the presence or absence of speech of the target important matter and the presence or absence of operations, it may also be determined whether their order corresponds to a predetermined order. Another example of such operations may be scrolling a file of terms and conditions to the end, or in the case of a text chat, the operator sending the agreement file as an attachment to the customer, or the customer opening the file of the terms and conditions. In the case of a video call, such a movement can be an operator having shared and displayed a file of terms and conditions, or having displayed it for a certain period of time on the customer screen etc.

Speech and operations related to the important matters may be called "actions" as a whole. A system operation or the like related to the actions are detected and informed as an event.

<<Variation 3>>

In step S101 of FIG. 5, the call reasons are detected from at least one of the operator voice text and the customer voice text. However, for example, the call reasons may be detected by an Interactive Voice Response (IVR) system. In this case, the customer enters a number using the customer terminal 50 in response to guidance from the IVR system, and the call reason corresponding to the entered number is identified and detected.

The detection of call reasons by the IVR system described above may be combined with the detection of call reasons from at least one of the operator speech text and the customer speech text. For example, the IVR system may detect a general call reason (e.g., "conclusion of contract" and the like) and detect a more detailed call reason from at least one of the operator voice text and the customer voice text (e.g., "conclusion of contract for . . . service" and the like) from at least one of the operator voice text and the customer voice text. Alternatively, for example, if the customer has multiple call reasons, the first call reason may be detected by the IVR system, and the second and the following call reasons may be detected from at least one of the operator voice text and the customer voice text.

The present invention is not limited to the specifically disclosed embodiments above, but different variations, modifications, or combinations with a well-known technology can be made without departing from the scope of the present invention.

The present application is based on and claims priority to Japanese patent application No. 2021-059677 filed on Mar. 31, 2021, in Japan, the entire contents of which are hereby incorporated by reference.

REFERENCE SIGNS LIST

1 Contact center system
10 Important matter presentation device
20 Operator terminal
30 Administrator terminal
40 PBX
50 Customer terminal
60 Communication network
101 Voice recognition text conversion unit
102 Call reason detection unit
103 Target important-matter identification unit
104 Target important-matter transmission unit
105 Important-matter speech determination unit
106 History analysis unit
107 Call reason DB
108 Important matter DB
109 Important matter history DB

What is claimed is:

1. An information-processing apparatus comprising a processor configured to execute operations comprising:
identifying a reason of a conversation based on a predetermined condition and automatically recognized an inquiry content of an utterance spoken by a first speaker to a second speaker during the conversation;
identifying, based on the identified reason of the conversation, an important matter for completion, wherein the important matter represents a matter that the second speaker is to interact with the first speaker to satisfy the reason of the conversation, the important matter comprises one or more predetermined actions, and the one or more predetermined actions are to be performed either by the second speaker or a combination of the first speaker and the second speaker;
interactively presenting to the second speaker the one or more predetermined actions of the identified important matter; and
determining, based one or more interactive operations by at least the second speaker, completion of at least one of the one or more predetermined actions of the important matter, wherein the one or more predetermined actions of the identified important matter comprise a predetermined sequence of operations on an electronic file, and the determining further comprises determining the one or more interactive operations by at least the second speaker match the predetermined sequence of operations on the electronic file.

2. The information-processing apparatus according to claim 1, wherein the one or more predetermined actions of the identified important matter include at least speech related to the important matter and further comprise speech related to the important matter.

3. The information-processing apparatus according to claim 1, the processor further configured to execute a method comprising:
presenting the important matter that has been identified, to the second speaker in a form of a checklist; and
upon determining that the second speaker has taken the one or more predetermined actions of to the identified important matter, displaying information indicating that the one or more predetermined actions have been taken for the important matter.

4. The information-processing apparatus according to claim 1, wherein the determining includes whether the second speaker has taken the one or more predetermined actions of the important matter in a predetermined order.

5. The information-processing apparatus according to claim 1, the processor further configured to execute a method comprising:
detecting the inquiry contents from contents of the conversation among multiple persons,
wherein the identifying further includes identifying the important matter, depending on the inquiry contents that have been detected.

6. The information-processing apparatus according to claim 5, the processor further configured to execute a method comprising:
converting the contents of the conversation into text by voice recognition,
wherein the detecting further includes detecting the inquiry contents from the text into which the contents of the conversation have been converted.

7. A computer-implemented information-processing method comprising:
identifying a reason of a conversation based on a predetermined condition and automatically recognized an inquiry content of an utterance spoken by a first speaker to a second speaker during the conversation;
identifying, based on the identified reason of the conversation, an important matter for completion, wherein the important matter represents a matter that the second speaker is to interact with the first speaker to satisfy the reason of the conversation, the important matter comprises one or more predetermined actions, and the one or more predetermined actions are to be performed either by the second speaker or a combination of the first speaker and the second speaker;
interactively presenting to the second speaker the one or more predetermined actions of the identified important matter; and
determining, based on one or more interactive operations by at least the second speaker, completion of at least one of the one or more predetermined actions of the identified important matter, wherein the one or more predetermined actions of the identified important matter comprise a predetermined sequence of operations on an electronic file, and the determining further comprises determining the one or more interactive operations by at least the second speaker match the predetermined sequence of operations on the electronic file.

8. A computer-readable non-transitory recording medium storing computer-executable program instructions that when executed by a processor cause a computer system to execute operations comprising:
identifying a reason of a conversation based on a predetermined condition and automatically recognized an inquiry content of an utterance spoken by a first speaker to a second speaker during the conversation;

identifying, based on the identified reason of the conversation, an important matter for completion wherein the important matter represents a matter that the second speaker is to interact with the first speaker to satisfy the reason of the conversation, the important matter comprises one or more predetermined actions, and the one or more predetermined actions are to be performed either by the second speaker or a combination of the first speaker and the second speaker;

interactively presenting to the second speaker the one or more predetermined actions of the identified important matter; and determining, based on one or more interactive operations by at least the second speaker, completion of at least one of the one or more predetermined actions of the important matter, wherein the one or more predetermined actions of the identified important matter comprise a predetermined sequence of operations on an electronic file, and the determining further comprises determining the one or more interactive operations by at least the second speaker match the predetermined sequence of operations on the electronic file.

9. The computer-implemented information-processing method of claim 7, wherein the one or more predetermined actions of the identified important matter include at least speech related to the important matter and further comprise speech related to the important matter.

10. The computer-implemented information-processing method of claim 7, further comprising:
presenting the important matter that has been identified, to the second speaker in a form of a checklist; and
upon determining that the second speaker has taken the one or more predetermined actions of the identified important matter, displaying information indicating that the one or more predetermined actions have been taken for the important matter.

11. The computer-implemented information-processing method of claim 7,
wherein the determining includes whether the second speaker has taken the one or more predetermined actions of the identified important matter in a predetermined order.

12. The computer-implemented information-processing method of claim 7, further comprising:
detecting the inquiry contents from contents of the conversation among multiple persons,
wherein the identifying further includes identifying the important matter, depending on the inquiry contents that have been detected.

13. The computer-implemented information-processing method of claim 12, further comprising:
converting the contents of the conversation into text by voice recognition,
wherein the detecting further includes detecting the inquiry contents from the text into which the contents of the conversation have been converted.

14. The computer-readable non-transitory recording medium of claim 8, wherein the one or more predetermined actions of the identified important matter include at least one of the following:

speech related to the important matter, or
a predetermined operation on an electronic file related to the important matter.

15. The computer-readable non-transitory recording medium of claim 8, the computer-executable program instructions that when executed further causing the computer system to execute a method comprising:
presenting the important matter that have been identified, to the second speaker in a form of a checklist; and
upon determining that the second speaker has taken the one or more predetermined actions of the identified important matter, displaying information indicating that the one or more predetermined actions have been taken for the important matter.

16. The computer-readable non-transitory recording medium of claim 8, wherein the determining includes whether the second speaker has taken the one or more predetermined actions of the identified important matter in a predetermined order.

17. The computer-readable non-transitory recording medium of claim 8, the computer-executable program instructions that when executed further causing the computer system to execute a method comprising:
detecting the inquiry contents from contents of the conversation among multiple persons, wherein the identifying further includes identifying the important matter, depending on the inquiry contents that have been detected; and
converting the contents of the conversation into text by voice recognition, wherein the detecting further includes detecting the inquiry contents from the text into which the contents of the conversation have been converted.

18. The information-processing apparatus according to claim 1, wherein the operations on the electronic file related to the important matter include at least one of opening a file, scrolling a file to the end, sharing a file, and displaying a file.

19. The information-processing apparatus according to claim 1, wherein the one or more predetermined actions of the identified important matter include at least one of the following:
speech related to the important matter and a predetermined operation on the electronic file associated with the important matter,
wherein the processor is configured to detect whether the speech related to the important matter and the predetermined operation on the electronic file associated with the important matter are performed in a predetermined chronological sequence.

20. The information-processing apparatus according to claim 6, wherein the processor is configured to detect a call reason of the contents of the conversation based on the text and identify the important matter corresponding to the call reason.

21. The information-processing apparatus according to claim 6, wherein the contents of the conversation are associated with a plurality of call reasons, a first call reason among the plurality of call reasons is detected by an interactive voice response (IVR) system, a second call reason among the plurality of call reasons is detected from the text upon the first call reason being detected.

* * * * *